United States Patent
Shahani et al.

(10) Patent No.: US 10,458,009 B2
(45) Date of Patent: *Oct. 29, 2019

(54) FREE-MACHINING WROUGHT ALUMINIUM ALLOY PRODUCT AND MANUFACTURING PROCESS THEREOF

(71) Applicant: CONSTELLIUM EXTRUSIONS DECIN S.R.O., Decin V (CZ)

(72) Inventors: Ravi Shahani, Voreppe (FR); Lukasz Dolega, Grenoble (FR); Ivo Kolarik, Decin (CZ)

(73) Assignee: CONSTELLIUM EXTRUSIONS DECIN S.R.O., Decin V (CZ)

( * ) Notice: Subject to any disclaimer, the term of this patent is extended or adjusted under 35 U.S.C. 154(b) by 757 days.

This patent is subject to a terminal disclaimer.

(21) Appl. No.: 14/400,582

(22) PCT Filed: May 15, 2013

(86) PCT No.: PCT/EP2013/001424
§ 371 (c)(1),
(2) Date: Nov. 12, 2014

(87) PCT Pub. No.: WO2013/170953
PCT Pub. Date: Nov. 21, 2013

(65) Prior Publication Data
US 2015/0129370 A1 May 14, 2015

(30) Foreign Application Priority Data
May 15, 2012 (EP) .................................. 12003829

(51) Int. Cl.
| | | |
|---|---|---|
| C22C 21/02 | (2006.01) | |
| C22C 21/08 | (2006.01) | |
| C22F 1/043 | (2006.01) | |
| C22F 1/05 | (2006.01) | |
| C22F 1/057 | (2006.01) | |
| B22D 21/00 | (2006.01) | |
| C22C 21/14 | (2006.01) | |
| C22C 21/16 | (2006.01) | |
| C22F 1/04 | (2006.01) | |
| C22F 1/047 | (2006.01) | |
| F16D 65/18 | (2006.01) | |
| F16D 125/06 | (2012.01) | |
| C25D 11/04 | (2006.01) | |
| C25D 11/08 | (2006.01) | |

(52) U.S. Cl.
CPC ............ *C22F 1/057* (2013.01); *B22D 21/007* (2013.01); *C22C 21/02* (2013.01); *C22C 21/08* (2013.01); *C22C 21/14* (2013.01); *C22C 21/16* (2013.01); *C22F 1/04* (2013.01); *C22F 1/043* (2013.01); *C22F 1/047* (2013.01); *C22F 1/05* (2013.01); *F16D 65/18* (2013.01); *C25D 11/04* (2013.01); *C25D 11/08* (2013.01); *F16D 2125/06* (2013.01); *F16D 2200/003* (2013.01)

(58) Field of Classification Search
CPC ........... C22F 1/043; C22F 1/057; C22C 21/02
See application file for complete search history.

(56) References Cited

U.S. PATENT DOCUMENTS

| | | | |
|---|---|---|---|
| 6,059,902 A | | 5/2000 | Yoshihara et al. |
| 6,074,501 A | * | 6/2000 | Baxter .................... C22C 21/02 148/700 |
| 6,355,090 B1 | * | 3/2002 | Ohyama ............. C22B 21/0092 148/688 |
| 2002/0197506 A1 | * | 12/2002 | Ueno ................... B23K 35/286 428/654 |

FOREIGN PATENT DOCUMENTS

| | | | | |
|---|---|---|---|---|
| EP | 0828008 A2 | * | 3/1998 | .......... C22C 21/003 |
| JP | 9249931 | | 9/1997 | |
| JP | 11217647 A | | 8/1999 | |
| JP | 2001115226 A | * | 4/2001 | |
| JP | 2008266719 A | * | 11/2008 | |
| WO | 2005100623 A2 | | 10/2005 | |
| WO | 2010112698 A1 | | 10/2010 | |

OTHER PUBLICATIONS

International Search Report from corresponding PCT/EP2013/001424, dated Jul. 31, 2013.

\* cited by examiner

*Primary Examiner* — George Wyszomierski
*Assistant Examiner* — Janell C Morillo
(74) *Attorney, Agent, or Firm* — McBee Moore Woodward & Vanik IP, LLC

(57) ABSTRACT

A wrought aluminium alloy product having the following chemical composition, expressed in wt %:
  $1.3\% \leq Si \leq 12\%$,
  $1.35\% \leq Fe \leq 1.8\%$
wherein the total Fe+Si content is higher than 3.4%, preferably 3.6%;
  $0.15\% \leq Cu \leq 6\%$;
  $0.6\% \leq Mg \leq 3\%$;
  optionally, one or more of the following elements:
    $Mn \leq 1\%$;
    $Cr \leq 0.25\%$;
    $Ni \leq 3\%$;
    $Zn \leq 1\%$;
    $Ti \leq 0.1\%$;
    $Bi \leq 0.7\%$;
    $In \leq 0.7\%$;
    $Sn \leq 0.7\%$;
  other elements <0.05% each and 0.15% in total;
  and the balance aluminium.

15 Claims, No Drawings

FREE-MACHINING WROUGHT ALUMINIUM ALLOY PRODUCT AND MANUFACTURING PROCESS THEREOF

CROSS REFERENCE TO RELATED APPLICATIONS

This application is a § 371 National Stage Application of PCT/EP2013/001424, filed May 15, 2013, which claims priority to EP 12003829, filed May 15, 2012.

BACKGROUND

Field of the Invention

The present invention relates to a wrought aluminium alloy product for machining applications, particularly for free-cutting applications. The invention relates further to the field of precision-turned parts obtained from simple extruded products, essentially of the bar or rod type, made of an AA6xxx aluminium having a chemical composition which is optimized as a function of the suitability for extrusion and precision turning, and which, in particular, lacks elements, which have a low melting point and either are harmful to environment and health, such as lead, or can cause embrittlement of the metallurgical structure of the alloy.

Description of Related Art

Unless otherwise indicated, all the values pertaining to the chemical composition of the alloys are expressed in wt %. Moreover, all the aluminium alloys referred to are named, unless otherwise indicated, using the names defined by the Aluminium Association in the regularly published Registration Record Series.

Precision turning relates to the field of large-series manufacture of parts which are generally rotating parts (screw, bolt, axle, etc.) by removing material from bars or rods made of metal. The latter are generally obtained by extrusion from billets, particularly in the case of aluminium alloys. The parts are thus produced at high production rates in cutting machines with manual or digital control. They are used in various fields, from clock making to medical equipment, to the fields of transport (aeronautics, railroad, car) and industry (electrical, electronic, hydraulic . . . ).

The productivity and the surface roughness as well as the dimensional accuracy of the final part are the principal objectives associated with this type of manufacturing. Machinability can be defined as the relative ease of removing metal from a workpiece to obtain a finished product. As regards aluminium alloys, one of the most important properties related to the machinability is the break up of the formed chips. If the chips do not break up, long chips may be formed, which can lead to a wide range of problems, ranging from obtaining products that are out of specification to evacuating chips from the machined piece with high difficulty.

Until recent past, elements such as lead, tin, indium and bismuth were added because they form phases, which act as efficient chip breakers. A typical alloy for free-machining applications is AA6262, which contains a high level of lead and bismuth. Elements such as lead and bismuth, due to their low solubility in aluminium and their low melting point, melt as a result of the heating caused by the machining operation and consequently they form soft areas in the aluminium matrix. Due to soft areas in a hard matrix, chips of small size are easily broken during the machining or precision turning operation, thus allowing a rapid removal of the material and consequently a high machining productivity, preventing also a potential degradation of the final surface roughness of the part because of a higher amount of heat being evacuated with the broken chips.

However, due to the toxicity problems connected with the presence of lead, European laws increasingly limit the admissible content in alloys, such as aluminium alloys, particularly in alloys intended to be used for precision turning. The recent regulated limitation limits the lead concentration of aluminium alloys to 0.4%. For several years, precision turning alloy types were proposed having a low lead content, even being lead-free. Their composition was based on the presence of substitute elements which also have a low melting point, such as, tin, bismuth or indium. These alloys however do not exhibit exactly the same performances during precision turning as the alloys that contain lead. Moreover, these alloys sometimes pose problems of embrittlement due to the complete wetting of the grain boundaries by the low melting point phases originating from the substitute elements. This embrittlement could occur during machining when insufficient cooling is applied.

International patent application WO2005/100623 discloses a free-machining wrought AlMgSi-alloy product, preferably in extruded form, for machining or free-cutting applications, which contains, in weight %: Si 0.6-2.0, Fe 0.2-1.0, Mg 0.5-2.0, Cu max 1.0, Mn max 1.5, Zn max 1.0, Cr max 0.35, Ti max 0.35, Zr 0.04-0.3, impurities max 0.05 each, total max 0.15, Al balance.

Japanese patent application JP9249931 discloses an aluminium alloy with a composition consisting of, by mass, 1.5-12.0% Si, 0.5-6.0% Mg, 0.01-0.1% Ti, and the balance Al with inevitable impurities and containing, if necessary, either or both of 0.5-2.0%, by mass, Mn and 0.1-1.0% Cu or one or more kinds among 0.5-1.0% Fe, 0.1-0.5% Cr and 0.1-0.5% Zr.

U.S. Pat. No. 6,059,902 discloses aluminium alloy extruded products containing Si: 1.5-12%, Mg: 0.5-6% and, optionally, at least one of Mn: 0.5-2%, Cu: 0.15-3% and Cr: 0.04-0.35% and, further, containing Ti: 0.01-0.1%, inevitable impurities, and the balance of Al, in which the average grain size of secondary phase hard particles of Si-system compounds is from 2 to 20 µm and an area ratio thereof is from 2 to 12%. The alloy is melted to obtain a cast billet having DAS (Dendrite Arm Spacing) of 10 to 50 µm, which is then put to a soaking treatment at 450 to 520° C. and then to the extrusion process.

International patent application WO2010/112698 discloses free-machining extruded products made of an aluminium alloy having the following chemical composition, expressed in wt %: 0.8≤Si<1.5%; 1.0<Fe≤1.8%; Cu: <0.1%; Mn: <1%; Mg: 0.6-1.2%; Ni: <3.0%; Cr: <0.25%; Ti:<0.1%; other elements <0.05% each and 0.15% in total, and the balance aluminium.

However, these recently developed alloys do not exhibit in precision-turning applications results as good as the previous lead-containing alloys, in particular in terms of chip breaking.

Therefore, it is still an objective to obtain a free-Pb free-machining wrought alloy product which has properties similar to those products made of lead-containing alloy AA6262 or AA2011, i.e. which prevents from forming long chips during free-machining, has appropriate mechanical properties and corrosion resistance and is suitable to be anodized.

SUMMARY

A first object of the invention is an extruded product made of a wrought aluminium alloy having the following chemical composition, expressed in wt %:

1.3%≤Si≤12%,
1.35%≤Fe≤1.8%
wherein the total Fe+Si content is higher than 3.4%, preferably 3.6%;
0.15%≤Cu≤6%;
0.6%≤Mg≤3%;
optionally, one or more of the following elements:
Mn≤1%;
Cr≤0.25%;
Ni≤3%;
Zn≤1%;
Ti≤0.1%;
Bi≤0.7%;
In≤0.7%;
Sn≤0.7%
other elements 0.05% each and 0.15% in total;
and the balance aluminium.

DETAILED DESCRIPTION OF A PREFERRED EMBODIMENT

According to the invention, the wrought alloy product has Si content higher than 1.3 wt % to increase the strength, the hardness of the alloy product and to increase the amount of Si-containing intermetallic particles which together improve the machinability as the chips will shear off and break more easily. Preferably the Si content is significantly higher than 1.3 wt. %. Advantageously, Si content is higher than 1.55%. However, too high amounts of silicon result in precipitation of coarse diamond cubic-F lattice phase particles which lead to worse extrudability and increase the risk of incipient melt of secondary phase particles during homogenisation. The Si content is advantageously lower than 12% which is near the eutectic content and preferably lower than 5 wt %.

The wrought alloy product has Fe content higher than 1.35 wt. %, which forms a hard intermetallic phase containing aluminium which acts as a chip breaker. Fe content controls the amount secondary phase particles which promote the formation of short chips. Fe content is preferably higher than 1.55% but lower than 1.8% to prevent the formation of primary iron-containing phase during the cast of the billets which reduce extrudability. More preferably, Fe content is between 1.7 wt. % and 1.8 wt. %.

Even if components such as silicon and iron were already known as improving the machinability of aluminium alloys, the combination of both was not encouraged: in case of a high Si content, Fe content should not be higher than 1% (JP9249931); in case of a high Fe content, Si content should not be higher than 1.5% (WO2010/112698). In frame of the present invention, the applicant discovered that combining a high Si content and a high Fe content, such that Fe+Si≥3.4 wt. %, preferably ≥3.6 wt. %, gives an aluminium alloy which is still easily extrudable, and gives extruded products which have good machinability, i.e. prevent from forming long chips during free-machining, high mechanical properties and corrosion resistance, provided that this content is not too high, the maximal content depending on the amount of other components, which contribute to the formation of intermetallic phases. Considering the possible content ranges of these other components, (Si+Fe) content is advantageously lower than 8 wt %, and more preferably lower than 7 wt %.

The wrought alloy product has Mg content higher than 0.6%: the presence of Mg increases the strength of the alloy and increases the amount of Mg-containing intermetallic particles, which further improves the machinability as the chips shear off and break more easily. The Mg content may be 0.6-3 wt %. It is preferably defined in relationship with Si content: the higher is the silicon content, the higher must be the magnesium content to reduce the risk of incipient melting of the secondary phase particles during homogenization. However, too high magnesium content is not favourable to the extrudability and to the tool wear. Therefore, a magnesium content of 0.6-2 wt % is preferred where Si content is lower than 5 wt %.

Copper also increases significantly the strength of the alloy product. The alloy of the wrought product according to the present invention contains copper with a minimum content of 0.15 wt. %. The simultaneous presence of Cu, Si and Mg results in obtaining increased strength combined with reduced toughness of the alloy, which improves the breakability and the shape of the chips. Preferably, copper content is higher than 0.65% but lower than 6%, preferably lower than 1% because of its adverse effect on extrudability.

Manganese is an optional component. It forms hard intermetallic phases with other elements, which act as chip breakers. Mn also forms fine dispersoids which increase the strength of the alloy. However, a too high Mn content gives to the extruded products an undesired and unstable aspect after anodisation. Therefore, the alloy of the present invention contains maximum 1 wt % Mn. Combined with iron, manganese forms coarse primary phase particles, the size of which is typically 50-100 µm, which leads to a significant loss of ductility of the alloy. Therefore, Fe+Mn content is preferably lower than 1.9 wt %.

Nickel is also an optional component. Like manganese, it participates in the formation of secondary phase particles appropriate to the chip breaking during precision- or bar-turning. Its content is limited to 3% to prevent the formation of primary phases having an embrittlement effect. Ni content is advantageously lower than 1 wt %.

The wrought alloy product has optionally a Zn content of max 1 wt %. In particular in combination with Mg and/or Cu, Zn increases the strength of the alloy product.

The wrought alloy product may also contain bismuth, tin or indium. Like lead, these elements may form soft phases with low melting temperatures. During the formation of the chip, these soft phases form weakness spots in the material such that the chip may easier break. In the present invention, Bi, Sn or In content is lower than 0.7%. However they are preferably present in the alloy with a content low enough that they are combined with other elements to form intermetallic phases acting as chip breakers, which prevents the formation of soft phases with low melting temperature. In a preferred embodiment, the content of at least one of these elements is slightly higher than 0.05 wt. % and lower than 0.4 wt. %.

Chromium may also form hard intermetallic phases with other elements which have limited effectiveness as chip breakers. Chromium also forms fine dispersoids, which increase the strength of the alloy. This is an anti-recrystallizing element, which may form like manganese secondary phases that affect the grain structure of the alloy. Its content is kept below 0.25 wt % because of its adverse effect on extrudability. The preferred Cr content is between 0.1 wt % and 0.2 wt %. Combined with iron and/or manganese, chromium may also form coarse primary phase particles, which lead to a significant loss of ductility of the alloy. Therefore, Fe+Mn+Cr content is preferably lower than 2.1 wt %, more preferably lower than 2.0 wt. %.

Titanium promotes the grain refinement of primary aluminium and influences the distribution of secondary phases mentioned above. It is added as a grain refiner of the as-cast microstructure and can be present up to a maximum of 0.1 wt %. As known in the art of grain refining aluminium wrought alloys, the Ti can be added in conjunction with or as $TiB_2$ and/or TiC. Its content is limited to 0.1% because of its adverse impact on the extrudability.

Another object of the invention is a method for manufacturing a free-machining wrought aluminium alloy product comprising the steps of:
(i) casting a billet made of an alloy having a chemical composition as above;
(ii) homogenising the said cast billet at a temperature in the range of 525° C. to 580° C., preferably between 535° C. and 555° C., for at least one hour,
(iii) extruding the said homogenised billet,
(iv) solution heat treating the extruded product at a temperature above 500° C. followed by a quench, preferably a water quench, and whereby the solution heat treatment can be either done thanks the heat generated during extrusion or controlled by using a separate heat treatment furnace,
(v) ageing the alloy of the extruded and quenched product.

Thanks to this process, where the homogenisation is carried out at an elevated temperature, typically 545° C. during 5 or 6 hours, the extruded product has mechanical properties similar to those of AA6262 extruded bars having the same geometry and the same temper. The extruded product is obtained either on a direct extrusion press or on an indirect extrusion press with pre-heating the billet at approx. 500° C., preferably between 480° C. and 520° C., and extruding it with extrusion ratio around 20, preferably between 10 and 50, and extrusion speed around 10 m/min, preferably between 5 and 30 m/min.

The extruded product obtained by the process above comprises secondary phase hard particles having an average grain size lower than 2 µm, typically between 1 µm and 2 µm, and an area ratio between 5% and 15%. They contribute to the high mechanical properties of the alloy and help the chips to break, probably because of the high amount of intermetallic particles which act as anchoring spots by stopping the slipping of dislocations, which results in the formation of cavities facilitating the chips to break. Best results have been obtained with extruded products which have after an appropriate ageing treatment an ultimate tensile strength higher than 400 MPa, even if the Cu content is lower than 1.4 wt. %.

Another object of the invention is the use of a wrought aluminium alloy product according to the invention, wherein the said wrought aluminium alloy product is machined by using any machining metal cutting operation and then hard anodised to have typically an anodised layer of approximately 30 µm with a low roughness, the roughness Rmax of its anodised surface being preferably less than 4 µm, more preferably less than 3 µm, to obtain in particular improved braking piston bodies.

Indeed, the applicant noticed that wrought aluminium alloy products according to the invention exhibit an excellent surface roughness after anodisation, significantly better than the surface roughness after anodisation of known products made of heavy metal-free free-machining alloy. The use of wrought aluminium alloy products according to the invention is in particular recommended for production of braking piston bodies because of their excellent mechanical properties, machinability and their excellent aptitude to have a low surface roughness after anodisation.

Surface roughness resulting from anodisation depends on several parameters, among which are the surface roughness before anodisation, the anodisation process and the alloy to be anodized, in particular the distribution, size and chemical nature of the phases present in its microstructure. One of the applications, for which the anodized surface roughness is very important, is the manufacture of braking piston bodies. A braking piston body is a part produced typically from wrought aluminium bars by machining of a desired shape, typically of a cylindrical form. High performance braking piston bodies are then hard anodized to obtain an anodized layer thickness of approximately 30 µm.

The applicant discovered that braking piston bodies extruded from the alloy according to the invention, then machined and hard anodized have a roughness similar to, even slightly better than the roughness of previous heavy metal containing free-machining alloys and better than the roughness of known heavy metal-free free-machining alloys.

The invention will be better understood with the following examples, which however do not have any limiting effect on the invention.

EXAMPLES

Example 1

Six alloys were cast using direct chill (DC) casting process to form 2.5-3.2 m logs having a diameter of 120 mm. The compositions of these alloys are listed in Table I.

TABLE I

| | | Si | Fe | Cu | Mn | Mg | Cr | Ni |
|---|---|---|---|---|---|---|---|---|
| A | Compar. | 2.13 | 1.46 | 0.01 | 0.44 | 0.82 | 0.00 | 0.90 |
| B | Compar. | 1.94 | 1.45 | 0.07 | 0.41 | 0.76 | 0.00 | 2.20 |
| C | Invention | 2.12 | 1.46 | 0.35 | 0.39 | 0.81 | 0.10 | 0.92 |
| D | Invention | 2.12 | 1.45 | 0.83 | 0.39 | 0.79 | 0.11 | 0.92 |
| E | Compar. | 1.50 | 1.46 | 0.01 | 0.99 | 0.81 | 0.00 | 0.01 |
| F | Compar. | 1.43 | 1.38 | 0.01 | 0.94 | 0.77 | 0.00 | 0.92 |
| G | Compar. | 2.10 | 1.35 | 0.35 | 1.41 | 0.80 | 0.09 | 0.91 |

All of these alloys have a titanium content of 0.04-0.05 wt. %.

Alloys C and D have a chemical composition according to the invention, while alloys A and B have a low Cu content, alloys E and F have a chemical composition according to WO2010/112698 and alloy G has higher Mn content than the alloys according to the invention.

The logs were homogenized at a temperature of 545° C. for 5 h 30 min. They were then cut to obtain billets having a length of 220 mm. The billets were heated to 500° C. and then extruded on an indirect 6.3 MN extrusion press to form tubes having an external diameter of 30 mm and an internal diameter of 15 mm, consequently having a 7.5 mm thick wall. The extruded tubes exited from the extrusion press with an extrusion speed of 6 m/min and were water quenched near the die exit. The tubes were then artificially aged for 10 h at 170° C. to obtain the maximum mechanical strength.

For each alloy, one tube was machined according to EN-755-1 to sample tensile test specimens. The mechanical properties of each alloy are listed in Table 2, where Rp is the yield strength measured where a 0.2% permanent extension is observed after stress release, Rm is the tensile strength and A5% is the permanent extension of the gauge length after fracture, expressed as a percentage of the original gauge length L0, where L0 is taken equal to 5.65√S0 and S0 is the initial section of the test-piece.

TABLE II

| Alloy | Rm (MPa) | Rp (MPa) | A5 (%) |
|---|---|---|---|
| A | 367 | 327 | 10.4 |
| B | 382 | 330 | 9.3 |
| C | 401 | 352 | 10.9 |
| D | 420 | 362 | 11.6 |
| E | 358 | 318 | 12.4 |
| F | 366 | 329 | 10.5 |
| G | 400 | 346 | 7.0 |

The mechanical properties of alloys C and D are higher than those of E and F, with similar elongation. They are also higher than those of alloys A and B. These values may be also compared to mechanical properties of extruded bars having a diameter of 30 mm made of a AA6262 alloy in temper T6, where Rm is typically near 400 MPa and Rp typically near 350 MPa. The elongation of alloy G dropped to 7%, probably due to a too high amount of Mn and/or Mn+Fe and/or Mn+Fe+Cr content.

The machinability of the alloys was evaluated by observing their chip breakability. It was measured by collecting all of the chips resulting from a pre-defined machining operation and calculating their number in a determined mass of collected chips, here a mass of 100 g (No. of chips/100 g). The machining operation was done using a CNC turning lathe SP 12 CNC and a rhombic 80° basic-shaped insert sold under registered trademark SANDVIK Coromant Coroturn® 107 with reference CCGX 09 T3 04-AL designed for turning of aluminium alloys. Following machining parameters were applied: rotation speed 3150 rpm/min, feed 0.3 mm/rev and depth of cut 3.5 mm. Mean values of the chip number in 100 g, with a 95% confidence interval approximately equal to ±500, are listed in Table III. Best results are obtained on samples corresponding to alloys C, D and G, which show an excellent cheap breaking, while samples A (low Cu content) and B (high Ni content) give results with a moderate chip breaking and samples E and F give insufficient results with a mediocre chip breaking.

The average particle size and the area ratio (also called "surface fraction") of the secondary phase particles, also listed in Table III, were determined on each sample based on an optical microscopic photograph taken at magnification 500 by using an image analyzing software. Particle size was defined as the diameter of the circle having the area of the particle. Average particle size has been obtained by calculating the arithmetic mean of the particle size of all detectable particles.

Alloy G has a composition in favour of excellent chip breaking but its structure comprises coarse primary particles, which give as a result a significant loss of ductility of the alloy.

TABLE III

| Alloy | No chips/100 g (±500) | Surface fraction of particles | average particle size (μm) |
|---|---|---|---|
| A | 3600 | 7% | 1.4 |
| B | 4400 | 13% | 1.4 |
| C | 7000 | 8% | 1.4 |
| D | 8300 | 7% | 1.6 |
| E | 2000 | 8% | 1.2 |
| F | 3200 | 6% | 1.4 |
| G | 6200 | 9% + primaries | 1.6 |

These observations are thus not entirely compatible with those described in U.S. Pat. No. 6,059,902. In particular, the average secondary phase particle size is advantageously lower than 2 μm. Either the explanation given in U.S. Pat. No. 6,059,902, based on the slipping line accumulation, is not entirely true or the size limit of 2 μm does not prevent the accumulation of slipping lines, at least for the alloys having the chemical composition according to the invention. We note also that the best chip breaking results are obtained with alloys having the maximum strength (higher than 400 MPa).

Example 2

Samples were extracted from several tubes having an external diameter of 30 mm and a thickness of 7.5 mm, which were extruded from alloys C, D, F and G, the chemical compositions of which are listed in Table I The manufacturing process of the samples is as follows:
1 Cutting of the extruded tubes in 70 mm lengths and milling along a diametrical surface of the said tubes;
2 Polishing of diametrical flat surface;
3 Degreasing;
4 Washing;
5 Hard anodization: electrolyte with H2SO4 to obtain an oxide layer thickness of 30 μm.

Roughness measurements were made on the diametrical flat anodised surfaces, along the axial direction of the samples. Three roughness parameters have been measured:
  Rmax: Maximum roughness depth of the roughness profile
  Ra: Arithmetic Mean Deviation of the roughness profile
  Rz: Average maximum height of the roughness profile The roughness values, listed on table IV, show that the samples made of alloys C and D have a roughness smaller than the roughness of F and G.

TABLE IV

|   |   | Mean Ra (μm) | Mean Rz (μm) | Mean Rmax (μm) |
|---|---|---|---|---|
| C | Invention | 0.29 | 1.80 | 2.10 |
| D | Invention | 0.35 | 2.25 | 2.94 |
| F | Compar. | 0.55 | 3.60 | 4.18 |
| G | Compar. | 0.71 | 4.03 | 5.18 |

The invention claimed is:

1. A wrought aluminium alloy product having the following chemical composition, expressed in weight % (wt. %):
  1.3%≤Si≤12%,
  1.35%≤Fe≤1.8%
wherein the total Fe+Si content is higher than 3.4%;
  0.15%≤Cu≤1%;
  0.6%≤Mg≤3%;
  optionally, one or more of the following elements:
    Mn≤1%;
    Cr≤0.25%;
    Ni≤3%;
    Zn≤1%;
    Ti≤0.1%;
    Bi≤0.7%;
    In≤0.7%;
    Sn≤0.7%
  other elements <0.05% each and 0.15% in total;
wherein the total Fe+Mn content is lower than 1.9 wt % and the balance aluminium,
and wherein ultimate tensile strength of the wrought aluminum alloy product is higher than 400 Mpa.

2. A wrought aluminium alloy product according to claim 1, wherein the total Fe+Si+Cu content is higher than 4 wt. %.

3. A wrought aluminium alloy product according to claim 1, wherein the Fe content is equal to or higher than 1.55 wt. %.

4. A wrought aluminium alloy product according to claim 1, wherein the Si content is equal to or higher than 1.55 wt. %.

5. A wrought aluminium alloy product according to claim 1, wherein the Si content is lower than 5 wt %.

6. A wrought aluminium alloy product according to claim 1, wherein the Fe content expressed in wt. % is such that $1.7\% < Fe \leq 1.8\%$.

7. A wrought aluminium alloy product according to claim 1, wherein the Cu content expressed in wt. % is higher than 0.65%.

8. A wrought aluminium alloy product according to claim 1, wherein Bi content is from 0.05 wt. % to 0.4 wt. %.

9. A wrought aluminium alloy product according to claim 1, wherein Sn content is from 0.05 wt. % to 0.4 wt. %.

10. A wrought aluminium alloy product according to claim 1, wherein Fe+Mn+Cr content is lower than 2.1 wt %.

11. A wrought aluminium alloy product according to claim 1, that is machined and then hard anodised to obtain a braking piston body.

12. A wrought aluminium alloy product of claim 1, consisting of the following chemical composition, expressed in weight % (wt. %):
$1.3\% \leq Si \leq 12\%$,
$1.35\% \leq Fe \leq 1.8\%$
wherein the total Fe+Si content is higher than 3.4%;
$0.15\% \leq Cu \leq 1\%$
$0.6\% \leq Mg \leq 3\%$
optionally, one or more of the following elements:
   $Mn \leq 1\%$;
   $Cr \leq 0.25\%$;
   $Ni \leq 3\%$;
   $Zn \leq 1\%$;
   $Ti \leq 0.1\%$;
   $Bi \leq 0.7\%$;
   $In \leq 0.7\%$;
   $Sn \leq 0.7\%$
other elements <0.05% each and 0.15% in total;
wherein the total Fe+Mn content is lower than 1.9 wt %;
and the balance aluminium.

13. The wrought aluminium alloy product according to claim 1, wherein the total Fe+Si content is higher than 3.6%.

14. The wrought aluminium alloy product according to claim 10, wherein Fe+Mn+Cr content is lower than 2.0 wt %.

15. The wrought aluminium alloy product of claim 12, wherein the total Fe+Si content is higher than 3.6%.

* * * * *